Hermann Wendt,
Shears and Scissors.

Nº 89,364.      Patented April 27, 1869.

Witnesses
George J. Mauston
G. M. Ackerman

Inventor
Hermann Wendt
By
A. R. Haight
Attorney

UNITED STATES PATENT OFFICE.

HERMANN WENDT, OF ELIZABETH, NEW JERSEY, ASSIGNOR TO HENRY SEYMOUR & CO., OF NEW YORK CITY.

IMPROVEMENT IN SHEARS AND SCISSORS.

Specification forming part of Letters Patent No. 89,364, dated April 27, 1869.

*To all whom it may concern:*

Be it known that I, HERMANN WENDT, of Elizabeth, in the county of Union and State of New Jersey, have invented a new and useful Improvement in the Construction of Shears and Scissors; and I do hereby declare that the following is a full, clear, and exact description of the same, reference being had to the accompanying drawings, and to the letters of reference marked thereon, making a part of this specification.

This invention relates to a new and useful improvement in the construction of shears and scissors, and more especially relates to that class of shears and scissors in which steel blades are attached or welded to malleable cast-iron handles or shanks.

The object of the present invention is to construct the handles or shanks in such a manner that they will overlap and work one over the other, a stop being formed by the eyes or thumb and finger loops of the handles or shanks, as hereinafter fully shown and described.

Figure 1:
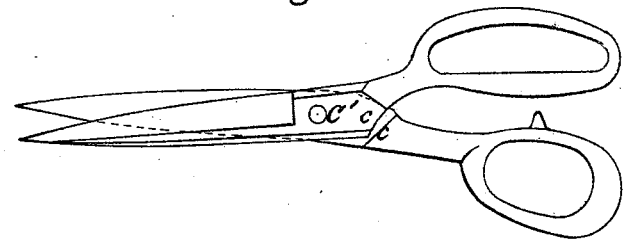
Figure 2:
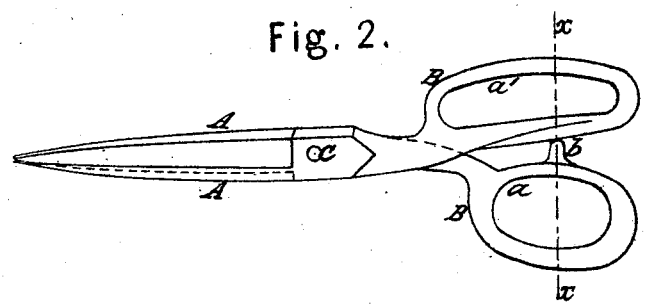
Figure 3:
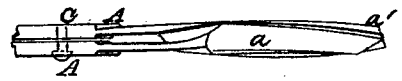
Figure 4:

In the accompanying sheet of drawings, Figure 1 is a side view of a pair of shears or scissors constructed according to the present mode; Fig. 2, a side view of a pair of shears or scissors constructed according to my invention; Fig. 3, an edge view of a portion of the shears or scissors shown in Fig. 2; Fig. 4, a transverse section of Fig. 2, taken in the line *x x*.

Similar letters of reference indicate corresponding parts in the several figures.

A A represent the blades or cutting portions of improved shears or scissors; B B', the malleable cast-iron handles or shanks, and C the rivet on which the two parts A A work. The handles or shanks B B' are bent, formed, or so constructed as to lap one over the other, and still admit of the eyes or loops *a a'* being in the same plane. This will be fully understood by referring to Figs. 3 and 4, the bend or curve being distinctly seen between the rivet C and the inner ends of the eyes or loops.

The closed position of the cutting-edges of the blades is determined by a projection or teat, *b*, on the eye or loop *a*, which projection or teat comes in contact with the loop *a'*, as illustrated clearly in Fig. 4, and also in Fig. 2.

By this arrangement it will be seen that in manufacturing the shears or scissors the precise position of the rivet C is not arbitrary. It may vary materially in position and still not affect the proper working of the blades, for the projection or teat *b* may be filed off so as to be of greater or less length, or the handles or shanks curved, so as to admit of the points of the cutting-edges of the blades slightly overlapping when the blades are fully closed.

The proper adjustment of the two parts of the shears or scissors, in order to insure a perfect cut, is, by my improvement, very readily accomplished, and at an inappreciable expense, as there is but one result to be attained—to wit, the slight lapping of the points of the blades when the latter are fully closed.

In my improvement the rivet-holes may be made without a strict regard to, or a very nice observance of, a precise locality. Hence much time is saved and the cost of manufacture very materially diminished, as rapidity is obtained and skilled labor in a great measure dispensed with.

Having thus described my invention, what I claim as new, and desire to secure by Letters Patent, is—

In shears or scissors which are provided with malleable cast-iron handles or shanks, the bending or curving of the handles or shanks so that they will lap and work one over the other, and still admit of the eyes or thumb and finger loops *a a'* being in the same plane, and one of the loops, *a*, provided with a projection or teat, *b*, to act against the other loop, *a'*, and serve as the only stop for the blades A A, substantially as herein shown and described.

HERMANN WENDT.

Witnesses:
 STANLEY G. MASON,
 JAMES M. HADDEN.